US006664747B2

(12) United States Patent
Kang

(10) Patent No.: US 6,664,747 B2
(45) Date of Patent: Dec. 16, 2003

(54) DYNAMIC FOCUS REGULATION CIRCUIT OF DISPLAY APPARATUS

(75) Inventor: Ho-Woong Kang, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 37 days.

(21) Appl. No.: 10/138,382

(22) Filed: May 6, 2002

(65) Prior Publication Data

US 2003/0057897 A1 Mar. 27, 2003

(30) Foreign Application Priority Data

Aug. 31, 2001 (KR) ........................................ 2001-53306

(51) Int. Cl.[7] ............................ G09G 1/28; H04N 5/68
(52) U.S. Cl. .................................. 315/368.21; 348/805
(58) Field of Search ........................... 315/364, 368.18, 315/368.21; 348/325, 333.01, 333.13, 805, 806

(56) References Cited

U.S. PATENT DOCUMENTS

| | | | | |
|---|---|---|---|---|
| 5,929,574 A | * 7/1999 | Kim et al. | .................. | 315/370 |
| 5,994,852 A | * 11/1999 | Lee | ............................ | 315/408 |
| 6,020,694 A | * 2/2000 | Shim | .......................... | 315/387 |
| 6,259,217 B1 | * 7/2001 | Song | .......................... | 315/387 |
| 6,297,861 B1 | * 10/2001 | Jo | .............................. | 348/806 |

FOREIGN PATENT DOCUMENTS

| | | |
|---|---|---|
| JP | 6-296239 | 10/1994 |
| JP | 7-283962 | 10/1995 |
| JP | 8-168019 | 6/1996 |
| JP | 9-139859 | 5/1997 |
| JP | 10-32728 | 2/1998 |
| JP | 10-66002 | 6/1998 |
| KR | 12444/93 | 6/1993 |
| KR | 26069/96 | 7/1996 |
| KR | 554/99 | 1/1999 |
| KR | 3703/99 | 1/1999 |

* cited by examiner

*Primary Examiner*—Tan Ho
*Assistant Examiner*—Minh D A

(57) ABSTRACT

A horizontal dynamic focus regulation circuit, which induces a horizontal dynamic focus waveform voltage by a horizontal deflection circuit generating a different frequency according to a display mode of a display apparatus, comprising a microcomputer outputting a plurality of control signals; a plurality of switching parts corresponding to the plurality of control signals outputted from the microcomputer, respectively; a plurality of S-regulation capacitors connecting with the plurality of switching parts in series, respectively; an auxiliary capacitor provided on a line diverged from a line connecting each switching part with each S-regulation capacitor, and being respectively connected with the S-regulation capacitor in parallel and series according to switching on and off of the switching part. With this configuration, the dynamic focus regulation circuit supplies a uniform parabolic waveform voltage regardless of variation of a horizontal frequency in a display mode.

4 Claims, 5 Drawing Sheets

DYNAMIC FOCUS REGULATION CIRCUIT OF DISPLAY APPARATUS

CLAIM OF PRIORITY

This application makes reference to, incorporates the same herein, and claims all benefits accruing under 35 U.S.C. §119 from an application for DYNAMIC FOCUS REGULATION CIRCUIT FOR DISPLAY DEVICE earlier filed in the Korean Industrial Property Office on Aug. 31, 2001 and there duly assigned Serial No. 2001-53306.

BACKGROUND OF THE INVENTION

1. Field of the Invention

The present invention relates in general to a display apparatus, and more particularly, to a dynamic focus regulation circuit for supplying a uniform parabolic waveform voltage regardless of variation of a horizontal frequency in a display mode.

2. Description of the Related Art

In a CRT (cathode ray tube) of a display apparatus, an electron beam is emitted from an electron gun unit to a panel coated with red/green/blue fluorescent material so as to form pixels, and thus a 2-dimensional picture is displayed on the panel by supplying a saw tooth waveform electric current to vertical and horizontal deflection coils.

In the conventional CRT, the panel is curved outwardly, and the distance between the electron gun unit and the panel is not uniform, and thus the sharpness of the picture becomes different according to the positions of pixels. That is, the sharpness on the edge of the panel is inferior to that on the center thereof. In the case of a high-resolution monitor, the above phenomenon is regulated by applying a regulation waveform voltage to the CRT focus voltage component by a focus regulation circuit. The regulation waveform is induced by an H-DY (Horizontal Deflection Yoke) generally outputting a horizontal deflection signal, and is synchronized with a deflection signal having a parabolic waveform.

FIG. 5 illustrates a conventional dynamic focus regulation circuit detecting a dynamic focus output waveform. As shown therein, the dynamic focus regulation circuit comprises a horizontal deflection circuit 110 oscillating a horizontal deflection signal, an S-regulation circuit 120 regulating an electric current outputted from the horizontal deflection circuit 110, a dynamic focus output circuit 130 outputting a dynamic focus waveform voltage by amplifying the parabolic waveform voltage from the S-regulation circuit 120, and a diode modulation circuit 140 horizontally modulating a raster.

The horizontal deflection circuit 110 includes a horizontal driving transistor 112, a damper diode 114, a resonance capacitor 116, and an H-DY 118.

The horizontal driving transistor 112 is switched on/off according to a horizontal driving signal generated by a video IC (not shown) or a horizontal oscillating IC (not shown). When the horizontal driving transistor 112 is switched on, B+ electric power from an FBT (Fly Back Transformer) is supplied to the H-DY 118.

If the horizontal driving transistor 112 is rapidly switched on according to the horizontal driving signal, an electric current is induced to the H-DY 118. On the other hand, if the horizontal driving transistor 112 is switched off, the electricity stored in the H-DY 118 is charged in the resonance capacitor 116. Herein, when the resonance capacitor 116 is perfectly charged with the electricity, the resonance capacitor 116 discharges its electricity to the H-DY 118, thereby re-storing the H-DY 118 with the electricity. Thereafter, according as the H-DY 118 is stored with electric energy, when the voltage of the H-DY 118 is so high that a forward bias can be applied to the damper diode 114, the damper diode 114 is shorted and the electricity of the H-DY 118 vanishes.

Thus, when the electricity of the H-DY 118 vanishes into zero, the horizontal driving transistor 112 is switched on again by the horizontal driving signal, to thereby repeat the above described process. Thus, an electric current having a saw tooth waveform is generated for deflecting an electron beam horizontally.

The S-regulation circuit 120 regulates the saw tooth waveform electric current applied to the H-DY 118 so as to maintain the linearity of a screen. The S-regulation circuit 120 includes a basic S-regulation capacitor 119 connected with the H-DY 118 and the resonance capacitor 116 in parallel, an S-regulation capacitor 122, and a switching transistor 124 switching on/off the S-regulation capacitor 122. Herein, the switching transistor 124 is controlled by a microcomputer 150.

With this configuration, if electric power is supplied to the S-regulation capacitor 122 by switching on/off the switching transistor 124 according to control of the microcomputer 150, the voltage applied to the H-DY 118 is regulated by means of combination of the capacitance of the S-regulation capacitor 122 and the capacitance of the basic S-regulation capacitor 119, thereby regulating the chopping waveform electric current.

Further, the dynamic focus output circuit 130 inverting-amplifies the convex parabolic waveform voltage across opposite ends of the basic S-regulation capacitor 119, to thereby output the dynamic focus waveform voltage.

The dynamic focus output circuit 130 is connected with two ends of the basic S-regulation capacitor 119, and includes a capacitor 134 applying only the AC signal of the convex parabolic waveform voltage through DC-coupling, a transformer (T) 132 inverting-boosts the convex parabolic waveform voltage outputted from the capacitor 134, and a capacitor 136 outputting the parabolic waveform voltage induced in a secondary side of the transformer (T) 132 through noise-removal and DC-coupling.

That is, the convex parabolic waveform voltage outputted from two ends of the basic S-regulation capacitor 119 is inverting-amplified through the capacitor 134 and the transformer (T) 132, and therefore changed into a convex parabolic waveform voltage to be outputted as the dynamic focus waveform voltage.

On the other hand, a monitor has various display modes. For example, a VGA mode has 640×480 resolution and a 31.5 KHz horizontal frequency, a SVGA mode has 1024*768 resolution and 35~37 KHz horizontal frequencies, and a high-resolution mode has 1024×768 through 1280×1024 resolution and 64~75 KHz horizontal frequencies.

To oscillate a horizontal deflection signal corresponding to the horizontal frequency, the capacitance of the S-regulation circuit 120 should be altered, i.e., the higher the resolution is, the higher the frequency of horizontal deflection signal should be. However, the higher the frequency of horizontal deflection is, the lower the parabolic waveform voltage generated from the S-regulation capacitor 122 is.

As described above, a frequency inputted to a display apparatus is altered according to setting up a display mode of the display apparatus, and therefore a parabolic waveform voltage corresponding to the horizontal frequency is altered. Thus, it is impossible to generate a precise focus voltage.

SUMMARY OF THE INVENTION

Accordingly, the present invention has been made keeping in mind the above-described shortcomings and user's need, and an object of the present invention is to provide a dynamic focus regulation circuit for supplying a uniform parabolic waveform voltage regardless of variation of a horizontal frequency in a display mode.

This and other objects of the present invention may be accomplished by the provision of a horizontal dynamic focus regulation circuit, which induces a horizontal dynamic focus waveform voltage by a horizontal deflection circuit generating a different frequency according to a display mode of a display apparatus, comprising a microcomputer outputting a plurality of control signals; a plurality of switching parts corresponding to the plurality of control signals outputted from the microcomputer, respectively; a plurality of S-regulation capacitors connecting with the plurality of switching parts in series, respectively; an auxiliary capacitor provided on a line diverged from a line connecting each switching part with each S-regulation capacitor, and being respectively connected with the S-regulation capacitor in parallel and series according to switching on and off of the switching part.

Preferably, each switching part is comprised of a transistor being switched on/off responsive to their respective control signals from the microcomputer according to the display mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

The present invention will be described in more detail with reference to the accompanying drawings.

Figure 1:
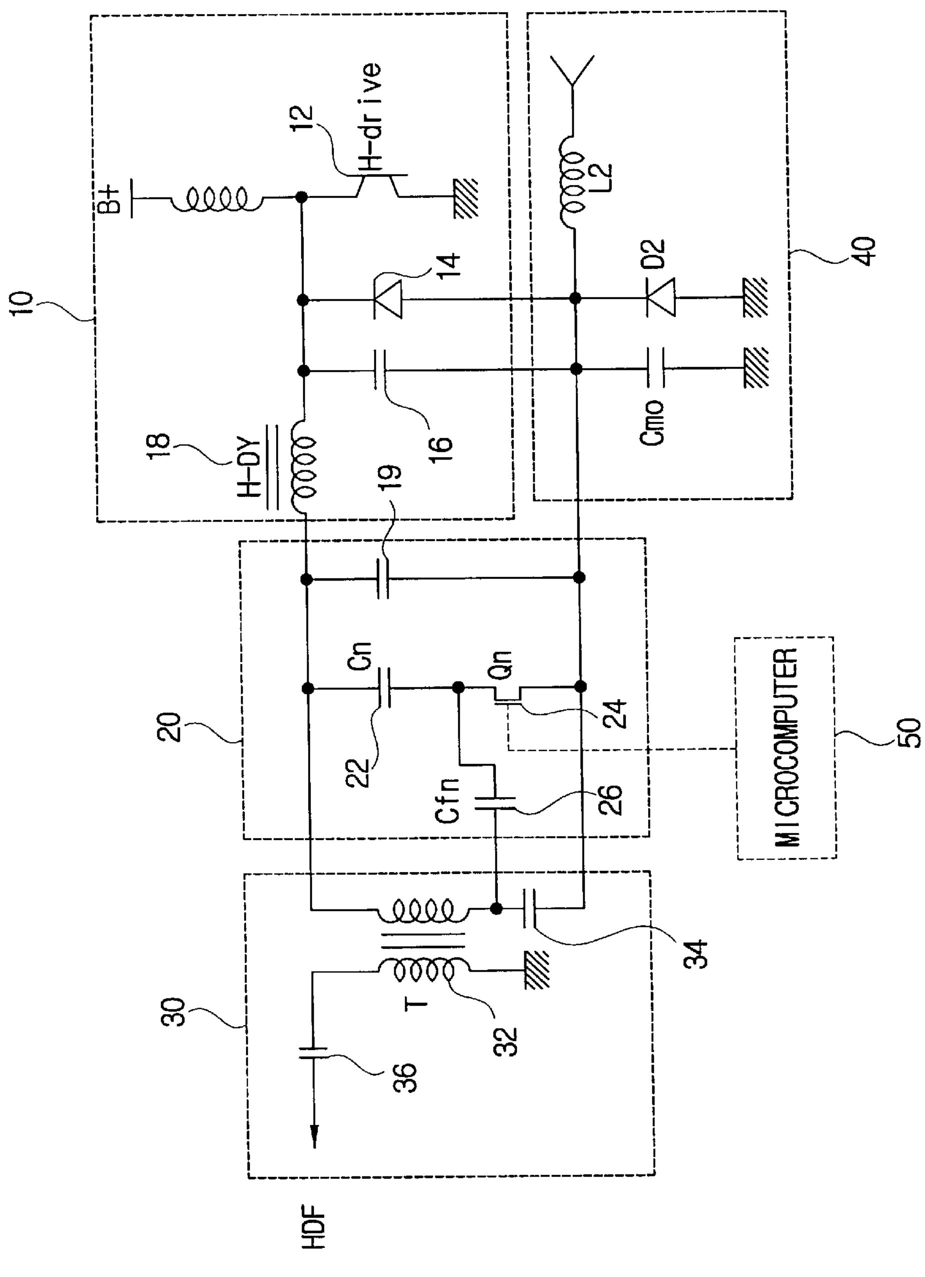
FIG. 1 shows a dynamic focus regulation circuit according to the present invention.

As shown in FIG. 1, a dynamic focus regulation circuit comprises a horizontal deflection circuit 10 oscillating a horizontal deflection signal, an S-regulation circuit 20 regulating an electric current induced to the horizontal deflection circuit 10, a dynamic focus output circuit 30 outputting a dynamic focus waveform voltage by amplifying a parabolic waveform voltage from the S-regulation circuit 20, and a diode modulation circuit 40 horizontally modulating a raster.

The dynamic focus output circuit 30 outputs a dynamic focus waveform voltage by inverting-amplifying a convex parabolic waveform voltage received from the S-regulation circuit 20 regulating an electric current of the horizontal deflection circuit 10, and adjusts the horizontal size of a screen.

The horizontal deflection circuit 10 includes a horizontal driving transistor 12, a damper diode 14, a resonance capacitor 16, and an H-DY 18. The horizontal driving transistor 12 is switched on/off so as to induce a saw tooth waveform electric current in the H-DY 18, thereby deflecting an electron beam emitted from an electron gun unit (not shown).

The dynamic focus output circuit 30 includes a capacitor 34 applying only the AC signal of signals outputted from opposite ends of a basic S-regulation capacitor 19 through DC-coupling, a transformer (T) 32 inverting-boosts the convex parabolic waveform voltage outputted from the capacitor 34, and a capacitor 36 outputting the parabolic waveform voltage induced in a secondary side of the transformer (T) 32 through noise-removal and DC-coupling. Thus, the dynamic focus waveform voltage is produced from the parabolic waveform voltage of the basic S-regulation capacitor 19.

The S-regulation circuit 20 includes the basic S-regulating capacitor 19 connected with the H-DY 18 and the resonance capacitor 16 in parallel, an S-regulation capacitor (Cn) 22, a switching transistor (Qn) 24 switching on/off the S-regulation capacitor 22, and an auxiliary capacitor (Cfn) 26 provided across the line in which the S-regulation capacitor 22 is connected and the line in which the capacitor 34 is connected. Herein, the switching transistor 24 is switched on/off according to control of a microcomputer 50. When the switching transistor 24 is switched on and off, the S-regulation capacitor 22 is connected with the auxiliary capacitor 26 in parallel and series, respectively. The switching transistor 24, the S-regulation capacitor 22 and the auxiliary capacitor 26 form a dynamic focus regulation circuit Qn, Cn and Cfn.

Figure 2:
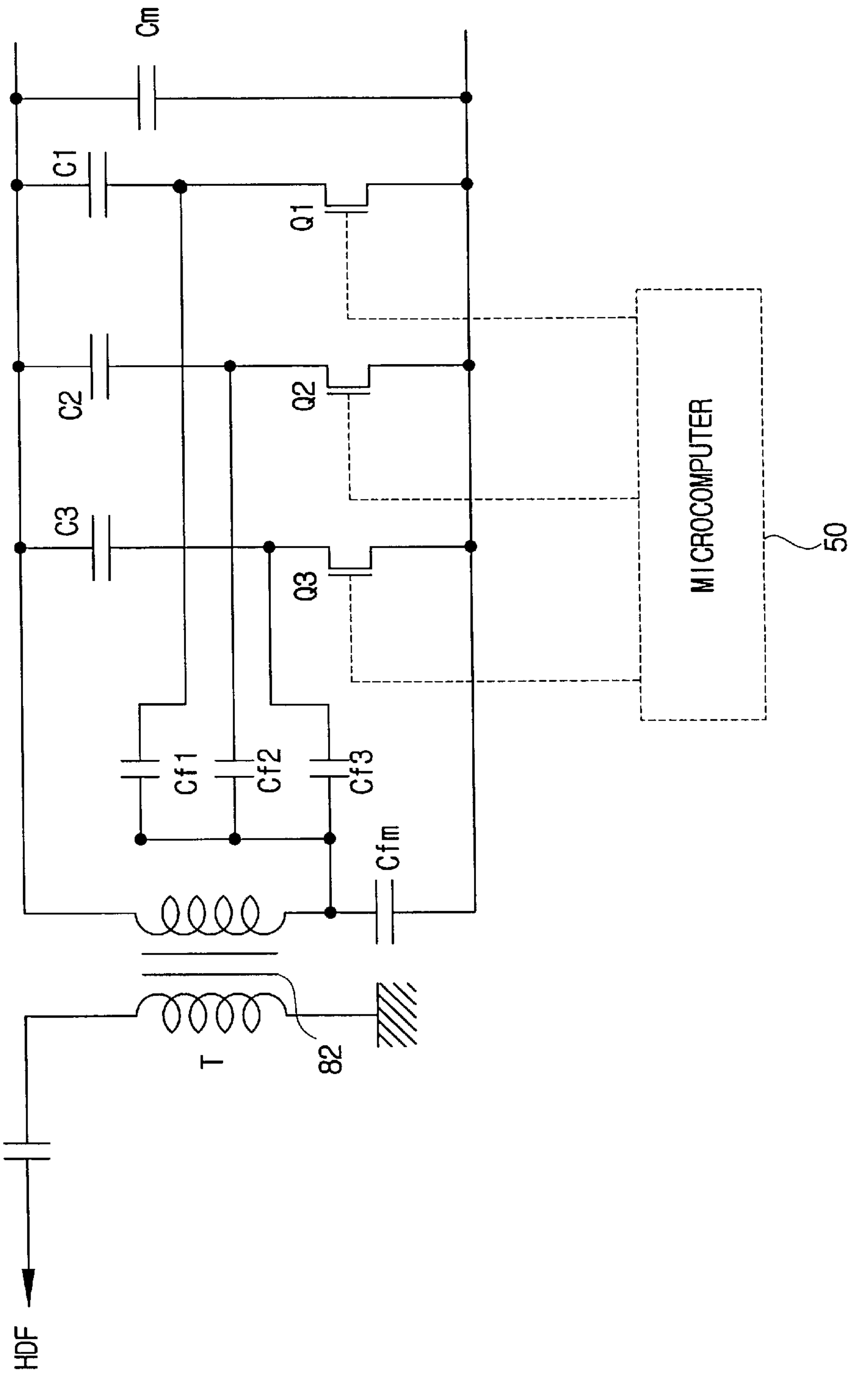
FIG. 2 shows a dynamic focus regulation circuit according to one embodiment of the present invention.

FIG. 2 illustrates one embodiment of the dynamic focus regulation circuit of a display apparatus in more detail, the display apparatus having three display modes, concentrating on S-regulation. As shown therein, the S-regulation is controlled by three S-regulation capacitors C1, C2, and C3 which are connected with each other in parallel via three switching transistors Q1, Q2, and Q3 which are respectively connected with the S-regulation capacitors C1, C2, and C3 in series, and three auxiliary capacitors Cf1, Cf2, and Cf3 which are provided between the lines from the lines connecting the S-regulation capacitors C1, C2, and C3 with the switching transistors Q1, Q2, and Q3 and a line of a primary side of a transformer (T) 82, respectively.

The switching transistors Q1, Q2, and Q3 are switched on/off according to control of the microcomputer 50. The microcomputer 50 selectively switches on/off the switching transistors Q1, Q2, and Q3 according to a selected video signal mode such as VGA, SVGA, etc. so as to produce a capacitance appropriate to the selected video signal.

Figure 3:
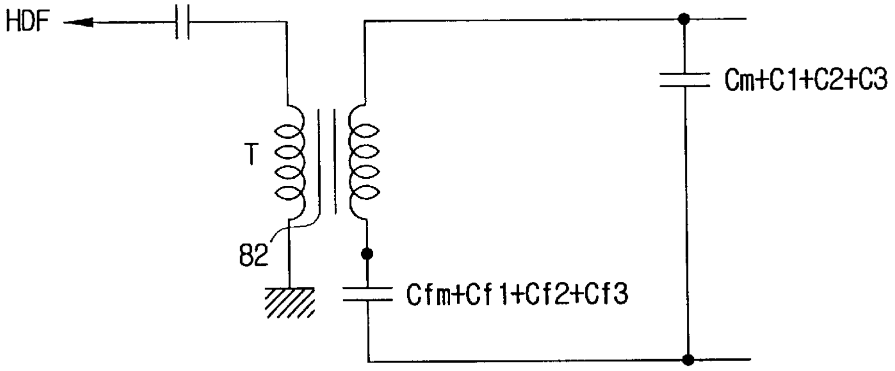
FIG. 3 shows one equivalent circuit of the dynamic focus regulation circuit in FIG. 2.

FIG. 3 illustrates an equivalent circuit, in which all the switching transistors Q1, Q2, and Q3 are switched on, of the dynamic focus regulation circuit in FIG. 2. As illustrated therein, when all the switching transistor Q1, Q2, and Q3 are switched on, a parabolic waveform voltage supplied to the primary side of the transformer 82 is equivalent to an AC parabolic waveform voltage applied to the capacitance (Cm+C1+C2+C3). Herein, a total capacitance of the auxiliary capacitors Cfm, Cf1, Cf2, and Cf3 is far less than a total capacitance of the S-regulation capacitors Cm, C1, C2, and C3. Accordingly, the voltage applied to the auxiliary capacitors Cfm, Cf1, Cf2, and Cf3 is near to zero, so that the parabolic waveform voltage supplied to the primary side of the transformer 82 is influenced by the S-regulation capacitors Cm, C1, C2, and C3.

Thus, when all the switching transistors Q1, Q2, and Q3 are switched on, the finally outputted dynamic focus waveform voltage has the value such as the AC parabolic waveform voltage applied to the capacitance (Cm+C1+C2+C3) inverting-amplified through the transformer 82. At this time, because the voltage applied to the primary side of the transformer 82 has a minimum value, a turns ratio of the transformer 82 is set on the basis of the state that all the switching transistors Q1, Q2, and Q3 are switched on.

Figure 4:
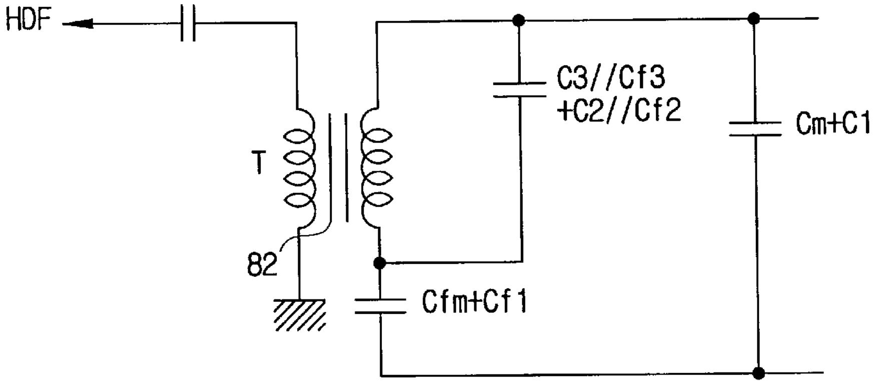
FIG. 4 shows another equivalent circuit of the dynamic focus regulation circuit in FIG. 2.
Figure 5:
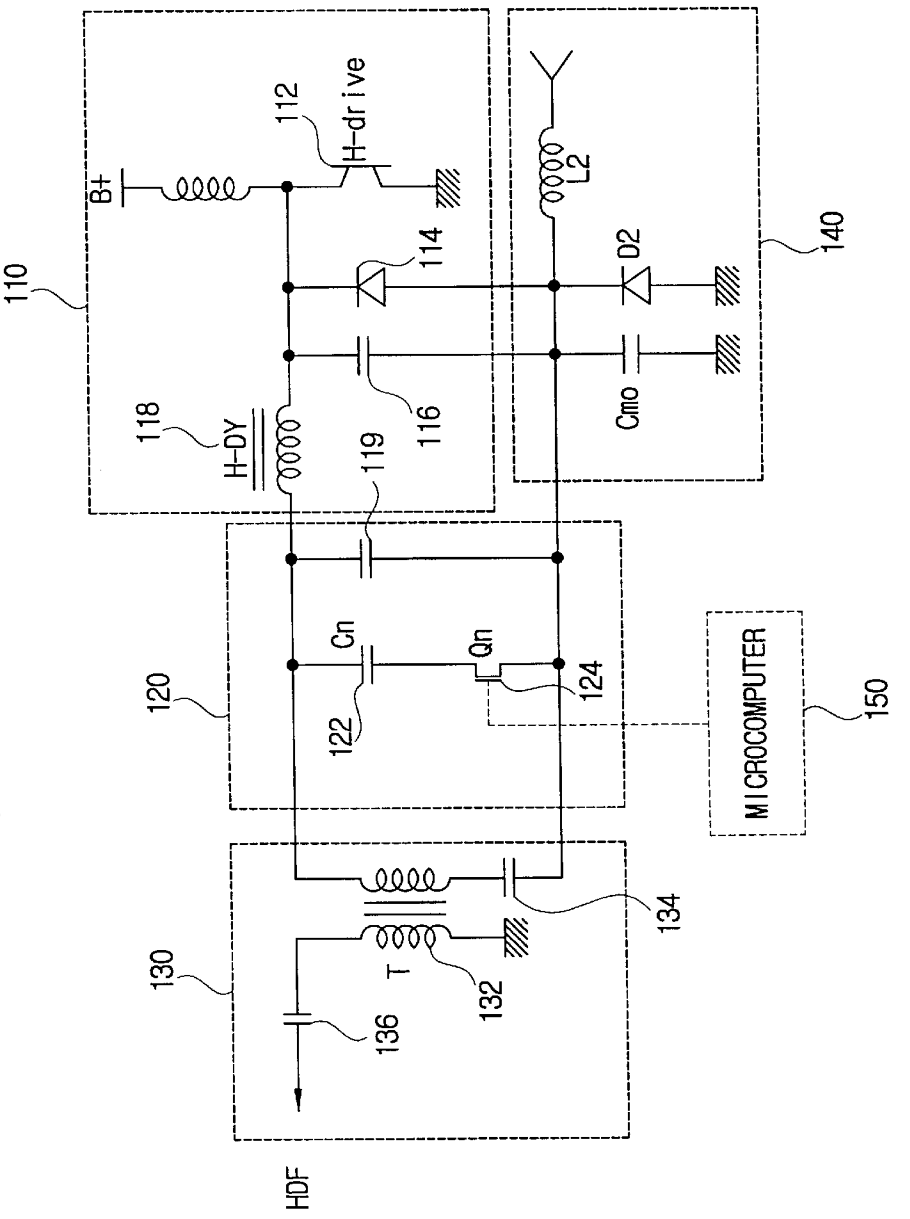
FIG. 5 (PRIOR ART)
FIG. 5 shows a conventional dynamic focus regulation circuit.

FIG. 4 illustrates an equivalent circuit, in which only the switching transistor Q1 is switched on, of the dynamic focus regulation circuit in FIG. 2. As illustrated therein, when the switching transistor Q1 is switched on, charging and discharging speed of the H-DY 18 is increased due to lowering the capacitance (Cm+C1). Thus, because the voltage applied to the capacitance (Cm+C1) gets higher, the convex parabolic waveform voltage is larger than the voltage in the case of the capacitance (Cm+C1+C2+C3). Herein, although the parabolic waveform voltage applied to the primary side of the transformer 82 is divided at the ratio of the capacitances (C3//Cf3+C2//Cf2) and (Cfm+Cf1), it is equivalent to the parabolic waveform voltage applied to the capacitance (Cm+C1+C2+C3). At this time, the capacitance of the auxiliary capacitors Cf1, Cf2, and Cf3 is predetermined so as to obtain a preferable voltage-dividing ratio.

Herein below, the voltage-dividing ratio according to the on/off state of the switching transistors Q1, Q2, and Q3 will be shown in Table 1.

TABLE 1

| Mode | Q1 | Q2 | Q3 | Voltage dividing ratio | Approximate voltage dividing ratio | S-regulation capacitance |
|---|---|---|---|---|---|---|
| Mode 1 | Off | Off | Off | Cfm:(C1//Cf1 + C2//Cf2 + C3//Cf3) | Cfm:(Cf1 + Cf2 + Cf3) | Cm |
| Mode 2 | On | Off | Off | (Cfm + Cf1):(C2//Cf2 + C3//Cf3) | (Cfm + Cf1):(Cf2 + Cf3) | Cm + C1 |
| Mode 3 | On | On | Off | (Cfm + Cf1 + Cf2):(C3//Cf3) | (Cfm + Cf1 + Cf2):Cf3 | Cm + C1 + C2 |
| Mode 4 | On | On | On | (Cfm + Cf1 + Cf2 + Cf3):0 | (Cfm + Cf1 + Cf2 + Cf3):0 | Cm + C1 + C2 + C3 |

As shown in Table 1, according to the on/off state of the switching transistor Q1, Q2, and Q3, the capacitance of the S-regulation circuit 20 is altered, thereby altering the parabolic waveform voltage outputted from the S-regulation circuit 20. However, at the primary side of the transformer is are provided the auxiliary capacitors Cfm, Cf1, Cf2, and Cf3 dividing the voltage applied to the S-regulation circuit 20, thereby always outputting a uniform parabolic waveform voltage.

As described above, according to the present invention, in a dynamic focus regulation circuit, which regulates a dynamic focus waveform voltage through a horizontal deflection circuit including an S-regulation circuit, is added an auxiliary capacitor dividing a voltage according to the voltage applied to the S-regulation circuit, thereby outputting a uniform parabolic waveform voltage. Therefore, the dynamic focus regulation circuit supplies the uniform parabolic waveform voltage regardless of variation of a horizontal frequency in a display mode.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A horizontal dynamic focus regulation circuit of an S-regulation circuit, which induces a horizontal dynamic focus waveform voltage by a horizontal deflection circuit generating a different frequency according to a horizontal frequency of a display mode of a display apparatus, the horizontal dynamic focus regulation circuit comprising:

a microcomputer outputting at least one control signal;

at least one switching transistor responsive to the control signal outputted from the microcomputer;

at least one dynamic S-regulation capacitor connected at a first node in series with said switching transistor, said dynamic S-regulation capacitor being coupled in parallel with a basic S-regulation capacitor of said S-regulation circuit when said switching transistor is turned on; and at least one auxiliary capacitor connected to one side of said switching transistor at said first node and connected to another side of said switching transistor via a dynamic focus capacitor of a dynamic focus output circuit connected in parallel with said S-regulation circuit, said dynamic S-regulation capacitor, said auxiliary capacitor and said dynamic focus capacitor being connected in series, said series connected dynamic S-regulation capacitor, auxiliary capacitor and dynamic focus capacitor being connected in parallel to said basic S-regulation capacitor when said switching transistor is turned off.

2. The horizontal dynamic focus regulation circuit according to claim 1, further comprising:

a plurality of switching transistors, each being separately responsive to respective control signals outputted from the microcomputer;

a corresponding plurality of dynamic S-regulation capacitors connected at respective nodes in series with respective ones of said switching transistors, each said dynamic S-regulation capacitor being coupled in parallel with said basic S-regulation capacitor of said S-regulation circuit when the corresponding ones of said switching transistors is turned on; and a corresponding plurality of auxiliary capacitors commonly connected at one end to said dynamic focus capacitor, each of said auxiliary capacitors being connected at another end thereof to respective ones of said nodes, thereby forming a corresponding plurality of series connected dynamic S-regulation, auxiliary and dynamic focus capacitors, each being connected in parallel to said basic S-regulation capacitor when their corresponding switching transistor is turned off.

3. A horizontal dynamic focus regulation circuit of an S-regulation circuit, which induces a horizontal dynamic focus waveform voltage by a horizontal deflection circuit generating a different frequency according to a horizontal frequency of a display mode of a display apparatus, the horizontal dynamic focus regulation circuit comprising:

a microcomputer outputting a plurality of control signals;

first, second and third switching transistors each being separately responsive to respective ones of said control signals, according to said display mode;

first, second and third dynamic S-regulation capacitors connected at respective first, second and third nodes in series with said first, second and third switching transistors, respectively, said first, second and third dynamic S-regulation capacitors each being coupled in parallel with a basic S-regulation capacitor of said S-regulation circuit when the respective first, second and third switching transistors are turned on;

first, second and third auxiliary capacitors connected to one side of respective ones of said first, second and third switching transistors at said first, second and third nodes, respectively, each of said first, second and third auxiliary capacitors being commonly connected to a dynamic focus capacitor of a dynamic focus output circuit connected in parallel with said S-regulation circuit;

said first dynamic S-regulation capacitor, said first auxiliary capacitor and said dynamic focus capacitor being connected in series to another side of said first switching transistor and being connected in parallel to said basic S-regulation capacitor when said first switching transistor is turned off;

said second dynamic S-regulation capacitor, said second auxiliary capacitor and said dynamic focus capacitor being connected in series to another side of said second switching transistor and being connected in parallel to said basic S-regulation capacitor when said second switching transistor is turned off; and said third dynamic S-regulation capacitor, said third auxiliary capacitor and said dynamic focus capacitor being connected in series to another side of said third switching transistor and being connected in parallel to said basic S-regulation capacitor when said third switching transistor is turned off.

4. The horizontal dynamic focus regulation circuit as set forth in claim 3, wherein said first, second and third switching transistors are each turned off in a first display mode, said first switching transistor is turned on and said second and third switching transistors are each turned off in a second display mode, said first and second switching transistors are turned on and said third switching transistor is turned off in a third display mode; and said first, second and third switching transistors are each turned on in a fourth display mode.

* * * * *